(12) United States Patent
Xiao et al.

(10) Patent No.: US 10,721,094 B2
(45) Date of Patent: Jul. 21, 2020

(54) ETHERNET RING PROTECTION SWITCHING METHOD AND NODE

(71) Applicant: Huawei Technologies Co., Ltd., Shenzhen (CN)

(72) Inventors: Wenhua Xiao, Wuhan (CN); Zufa Yang, Wuhan (CN); Jingtao Li, Shenzhen (CN); Hongjun Gao, Shenzhen (CN); Zhijiang Liao, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/794,873

(22) Filed: Oct. 26, 2017

(65) Prior Publication Data

US 2018/0048488 A1     Feb. 15, 2018

Related U.S. Application Data

(63) Continuation of application No. PCT/CN2015/091871, filed on Oct. 13, 2015.

(30) Foreign Application Priority Data

Apr. 27, 2015   (CN) .......................... 2015 1 0204315

(51) Int. Cl.
*H04L 12/437*   (2006.01)
*H04L 12/24*    (2006.01)
(Continued)

(52) U.S. Cl.
CPC ............ *H04L 12/437* (2013.01); *H04L 41/00* (2013.01); *H04L 41/12* (2013.01); *H04L 45/02* (2013.01); *H04L 45/28* (2013.01)

(58) Field of Classification Search
CPC ....... H04L 12/437; H04L 45/28; H04L 41/12; H04L 45/02; H04L 41/00
See application file for complete search history.

(56) References Cited

U.S. PATENT DOCUMENTS 7,593,319 B1      9/2009  Sivasankaran et al.
2012/0224471 A1*  9/2012  Vinod ................. H04L 43/0811
                                                  370/222

(Continued)

FOREIGN PATENT DOCUMENTS

CN      1812361 A    8/2006
CN      1909496 A    2/2007
(Continued)

OTHER PUBLICATIONS

Foreign Communication From A Counterpart Application, Chinese Application No. 201510204315.2, Chinese Office Action dated Sep. 13, 2018, 6 pages.
(Continued)

*Primary Examiner* — Un C Cho
*Assistant Examiner* — Yu-Wen Chang
(74) *Attorney, Agent, or Firm* — Conley Rose, P.C.

(57) ABSTRACT

An Ethernet ring protection switching (ERPS) method and a node, where the method includes clearing, by a first node, media access control (MAC) address forwarding tables of a first ERPS port and a second ERPS port, and simultaneously changing multiple ports including the first ERPS port and the second ERPS port to a broadcasting state when the first ERPS port becomes faulty, where the second ERPS port is another ERPS port except the first ERPS port, sending, in a broadcasting manner using a port in the multiple ports, the MAC packet to a target node when a MAC packet is received, and changing the multiple ports to a forwarding state, learning a MAC address according to a broadcasting path of the MAC packet to obtain a target MAC address (Continued)

forwarding table of the second ERPS port. Hence, ERPS efficiency may be improved.

16 Claims, 3 Drawing Sheets

(51) Int. Cl.
    *H04L 12/751*    (2013.01)
    *H04L 12/703*    (2013.01)

(56) References Cited

U.S. PATENT DOCUMENTS

| | | | |
|---|---|---|---|
| 2012/0250695 A1* | 10/2012 | Jia | H04L 12/42 370/400 |
| 2012/0317138 A1* | 12/2012 | Kitaichi | H04L 12/437 707/769 |
| 2013/0064071 A1 | 3/2013 | Bos et al. | |
| 2013/0077474 A1* | 3/2013 | Long | H04L 12/437 370/222 |
| 2013/0083647 A1 | 4/2013 | Xie | |
| 2014/0064060 A1 | 3/2014 | Kulambi et al. | |
| 2014/0293774 A1* | 10/2014 | Behrens | H04L 12/437 370/225 |

FOREIGN PATENT DOCUMENTS

| | | |
|---|---|---|
| CN | 102118291 A | 7/2011 |
| CN | 102347881 A | 2/2012 |
| EP | 2575296 A1 | 4/2013 |

OTHER PUBLICATIONS

Foreign Communication From A Counterpart Application, European Application No. 15890588.5, Extended European Search Report dated Jan. 11, 2018, 10 pages.
Machine Translation and Abstract of Chinese Publication No. CN1812361, Aug. 2, 2006, 18 pages.
Machine Translation and Abstract of Chinese Publication No. CN1909496, Feb. 7, 2007, 28 pages.
Machine Translation and Abstract of Chinese Publication No. CN102118291, Jul. 6, 2011, 21 pages.
"Series G: Transmission Systems and Media, Digital Systems and Networks, Packet over Transport aspects—Ethernet over Transport aspects, Series Y: Global Information Infrastructure, Internet Protocol Aspects and Next-Generation Networks, Internet protocol aspects—Transport, Ethernet ring protection switching," ITU-T, G.8032/Y.1344, Feb. 2012, 104 pages.
Foreign Communication From A Counterpart Application, PCT Application No. PCT/CN2015/091871, English Translation of International Search Report dated Jan. 28, 2016, 2 pages.
Foreign Communication From A Counterpart Application, PCT Application No. PCT/CN2015/091871, English Translation of Written Opinion dated Jan. 28, 2016, 5 pages.

\* cited by examiner

ETHERNET RING PROTECTION SWITCHING METHOD AND NODE

CROSS-REFERENCE TO RELATED APPLICATIONS

This application is a continuation of International Patent Application No. PCT/CN2015/091871 filed on Oct. 13, 2015, which claims priority to Chinese Patent Application No. 201510204315.2 filed on Apr. 27, 2015. The disclosures of the aforementioned applications are hereby incorporated by reference in their entireties.

TECHNICAL FIELD

The present application relates to the field of communications technologies, and in particular, to an Ethernet ring protection switching (ERPS) method and a node.

BACKGROUND

ERPS is the G.8032 standard formulated by the International Telecommunication Union-Telecommunication Standardization Sector, and the standard is based on traditional Ethernet Media Access Control (MAC) and bridge functions. Fast protection switching of an Ethernet ring network is implemented using a mature operation, administration and maintenance (OAM) function of the Ethernet and the Ring Automatic Protection Switching (R-APS) protocol. However, existing ERPS consumes longer time, and switching efficiency is relatively low.

SUMMARY

Embodiments of the present disclosure provide an ERPS method and a node in order to improve ERPS efficiency.

A first aspect of an embodiment of the present disclosure discloses an ERPS method, including clearing, by a first node, MAC address forwarding tables of a first ERPS port and a second ERPS port, and simultaneously changing multiple ports that include the first ERPS port and the second ERPS port to a broadcasting state when the first ERPS port becomes faulty, where the second ERPS port is another ERPS port except the first ERPS port, sending, by the first node, the MAC packet to a target node in a broadcasting manner using a port in the multiple ports when the first node receives a MAC packet, where the target node is a node, in nodes connected to the first node, except a node connected to the first ERPS port and a node that sends the MAC packet, and changing, by the first node, the multiple ports from the broadcasting state to a forwarding state, learning a MAC address according to a broadcasting path of the MAC packet to obtain a target MAC address forwarding table of the second ERPS port, and setting the target MAC address forwarding table as a MAC address forwarding table that is used by the second ERPS port to forward a MAC packet when the MAC address forwarding tables of the first ERPS port and the second ERPS port are cleared.

With reference to the first aspect of the embodiment of the present disclosure, in a first possible implementation manner of the first aspect of the embodiment of the present disclosure, the method further includes detecting, by the first node, whether a link connected to the first ERPS port becomes faulty, and determining that the first ERPS port becomes faulty if the link connected to the first ERPS port becomes faulty.

With reference to the first aspect of the embodiment of the present disclosure or the first possible implementation manner of the first aspect of the embodiment of the present disclosure, in a second possible implementation manner of the first aspect of the embodiment of the present disclosure, when the first ERPS port becomes faulty, and before clearing, by a first node, MAC address forwarding tables of the first ERPS port and a second ERPS port, the method further includes blocking, by the first node, the first ERPS port, and sending a signal failure (SF) message to a second node connected to the second ERPS port in order to trigger the second node to clear the MAC address forwarding tables of the two ERPS ports and simultaneously change the multiple ports that include the two ERPS ports to the broadcasting state.

With reference to the second possible implementation manner of the first aspect of the embodiment of the present disclosure, in a third possible implementation manner of the first aspect of the embodiment of the present disclosure, blocking, by the first node, the first ERPS port includes blocking, by the first node, the first ERPS port, and unblocking the blocked second ERPS port when the first node is a ring protection link (RPL) master node.

A second aspect of an embodiment of the present disclosure discloses a node, including a clearing and changing unit configured to clear MAC address forwarding tables of a first ERPS port and a second ERPS port, and simultaneously change multiple ports that include the first ERPS port and the second ERPS port to a broadcasting state when the first ERPS port becomes faulty, where the second ERPS port is another ERPS port except the first ERPS port, a communication unit configured to send the MAC packet to a target node in a broadcasting manner using a port in the multiple ports that are changed by the clearing and changing unit when a MAC packet is received, where the target node is a node, in nodes connected to the node, except a node connected to the first ERPS port and a node that sends the MAC packet, and a learning unit configured to change the multiple ports from the broadcasting state to a forwarding state, learn a MAC address according to a broadcasting path of the MAC packet to obtain a target MAC address forwarding table of the second ERPS port, and set the target MAC address forwarding table as a MAC address forwarding table that is used by the second ERPS port to forward a MAC packet when the MAC address forwarding tables of the first ERPS port and the second ERPS port are cleared by the clearing and changing unit.

With reference to the second aspect of the embodiment of the present disclosure, in a first possible implementation manner of the second aspect of the embodiment of the present disclosure, the node further includes a detection unit configured to detect whether a link connected to the first ERPS port becomes faulty, and determine that the first ERPS port becomes faulty if the link connected to the first ERPS port becomes faulty.

With reference to the second aspect of the embodiment of the present disclosure or the first possible implementation manner of the second aspect of the embodiment of the present disclosure, in a second possible implementation manner of the second aspect of the embodiment of the present disclosure, the node further includes a blocking unit configured to block the first ERPS port, and send an SF message to a second node connected to the second ERPS port in order to trigger the second node to clear the MAC address forwarding tables of the two ERPS ports and simultaneously change the multiple ports that include the two ERPS ports to the broadcasting state.

With reference to the second possible implementation manner of the second aspect of the embodiment of the present disclosure, in a third possible implementation manner of the second aspect of the embodiment of the present disclosure, a manner of blocking the first ERPS port by the blocking unit includes blocking the first ERPS port, and unblocking the blocked second ERPS port when the node is an RPL master node.

In the embodiments of the present disclosure, when an ERPS port becomes faulty, a MAC address forwarding table of the ERPS port is cleared, and simultaneously all ports are changed to a broadcasting state to broadcast a MAC packet. After the MAC address forwarding table of the ERPS port is cleared, a MAC address is learned. Because MAC address clearing and MAC packet broadcasting are performed simultaneously, ERPS time may be reduced, and ERPS efficiency may be improved.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure.

Embodiments of the present disclosure provide an ERPS method and a node in order to improve ERPS efficiency. The following separately provides detailed descriptions.

Figure 1:
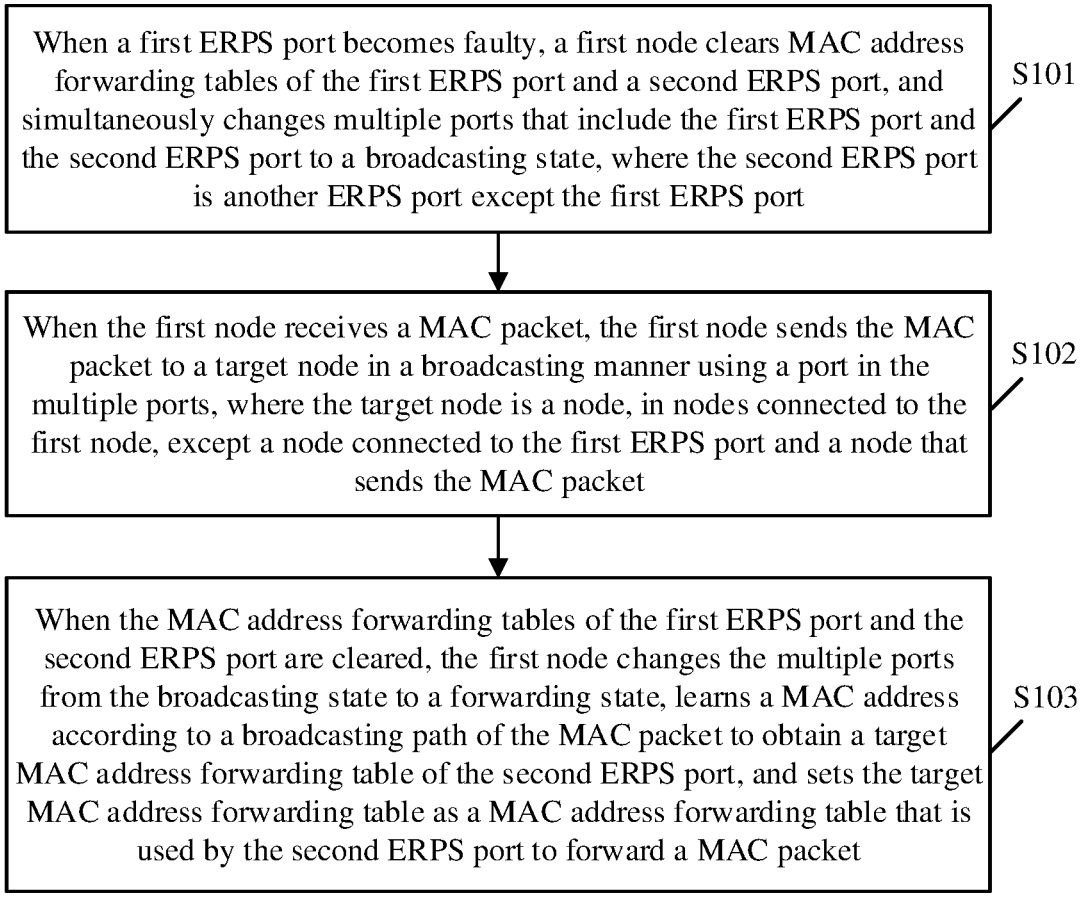
FIG. 1 is a flowchart of an ERPS method disclosed in an embodiment of the present disclosure.

Referring to FIG. 1, FIG. 1 is a flowchart of an ERPS method disclosed in an embodiment of the present disclosure. As shown in FIG. 1, the ERPS method may include the following steps.

Step S101: When a first ERPS port becomes faulty, a first node clears MAC address forwarding tables of the first ERPS port and a second ERPS port, and simultaneously changes multiple ports that include the first ERPS port and the second ERPS port to a broadcasting state, where the second ERPS port is another ERPS port except the first ERPS port.

In this embodiment, in order to prevent problems such as a broadcast storm and MAC address flapping from occurring in an Ethernet ring, a link in the Ethernet ring is designated as an RPL, and a node connected to the RPL is referred to as an RPL Owner, that is, an RPL master node. In a normal case, the RPL master node blocks an RPL port connected to the RPL in order to prevent a loop from being formed.

In this embodiment, each node in the Ethernet ring includes two ERPS ports that have an ERPS attribute, and the node in the Ethernet ring may detect, by means of a port status, whether the ERPS ports become faulty. The first node may be any node in the Ethernet ring, and the first ERPS port may be either port of two ERPS ports of the first node.

In this embodiment, detecting whether the first ERPS port becomes faulty may be detecting whether the first ERPS port itself becomes faulty, or may be detecting whether a link connected to the first ERPS port becomes faulty, which is not limited in this embodiment. Whether the first ERPS port itself becomes faulty may be detected using hardware of the first ERPS port, and whether the link connected to the first ERPS port becomes faulty may be detected by detecting whether a signal is lost.

In this embodiment, when the first ERPS port becomes faulty, it indicates that the first ERPS port cannot transmit a packet, and a packet originally transmitted using the first ERPS port cannot continue to be transmitted. Therefore, ERPS is triggered, and the first node blocks the first ERPS port such that after receiving a MAC packet, another port of the first node does not send the MAC packet to the first ERPS port. Then, the first node sends an SF message to a second node connected to the second ERPS port such that the second node sends the SF message to a third node, clears the MAC address forwarding tables of the two ERPS ports, and simultaneously changes the multiple ports that include the two ERPS ports to the broadcasting state. One ERPS port of the second node is connected to the first node, and the other ERPS port of the second node is connected to the third node.

In this embodiment, after sending the SF message to the second node, the first node clears the MAC address forwarding tables of the first ERPS port and the second ERPS port, and simultaneously changes the multiple ports that include the first ERPS port and the second ERPS port to the broadcasting state, where the second ERPS port is another ERPS port except the first ERPS port.

Step S102: When the first node receives a MAC packet, the first node sends the MAC packet to a target node in a broadcasting manner using a port in the multiple ports, where the target node is a node, in nodes connected to the first node, except a node connected to the first ERPS port and a node that sends the MAC packet.

In this embodiment, the first node includes not only the first ERPS port and the second ERPS port but also a non-ERPS port. When any port in the second ERPS port and the non-ERPS port that are of the first node receives the MAC packet, the port that receives the MAC packet broadcasts the MAC packet to all ports included in the first node except the first ERPS port and the port that receives the MAC packet, and the ports send the MAC packet to a connected node.

Step S103: When the MAC address forwarding tables of the first ERPS port and the second ERPS port are cleared, the first node changes the multiple ports from the broadcasting state to a forwarding state, learns a MAC address according to a broadcasting path of the MAC packet to obtain a target MAC address forwarding table of the second ERPS port, and sets the target MAC address forwarding table as a MAC address forwarding table that is used by the second ERPS port to forward a MAC packet.

In this embodiment, when it is detected that the MAC address forwarding tables of the first ERPS port and the second ERPS port are cleared, the first node changes the multiple ports from the broadcasting state to the forwarding state, learns the MAC address according to the broadcasting path of the MAC packet to obtain the target MAC address forwarding table of the second ERPS port, and sets the target MAC address forwarding table as the MAC address forwarding table that is used by the second ERPS port to forward a MAC packet. After receiving a MAC packet subsequently, the second ERPS port performs forwarding according to the target MAC address forwarding table.

In the ERPS method described in FIG. 1, when an ERPS port becomes faulty, a MAC address forwarding table of the ERPS port is cleared, and simultaneously all ports are changed to a broadcasting state to broadcast a MAC packet. After the MAC address forwarding table of the ERPS port is cleared, a MAC address is learned. Because MAC address clearing and MAC packet broadcasting are performed simultaneously, ERPS time may be reduced, and ERPS efficiency may be improved.

Figure 2:
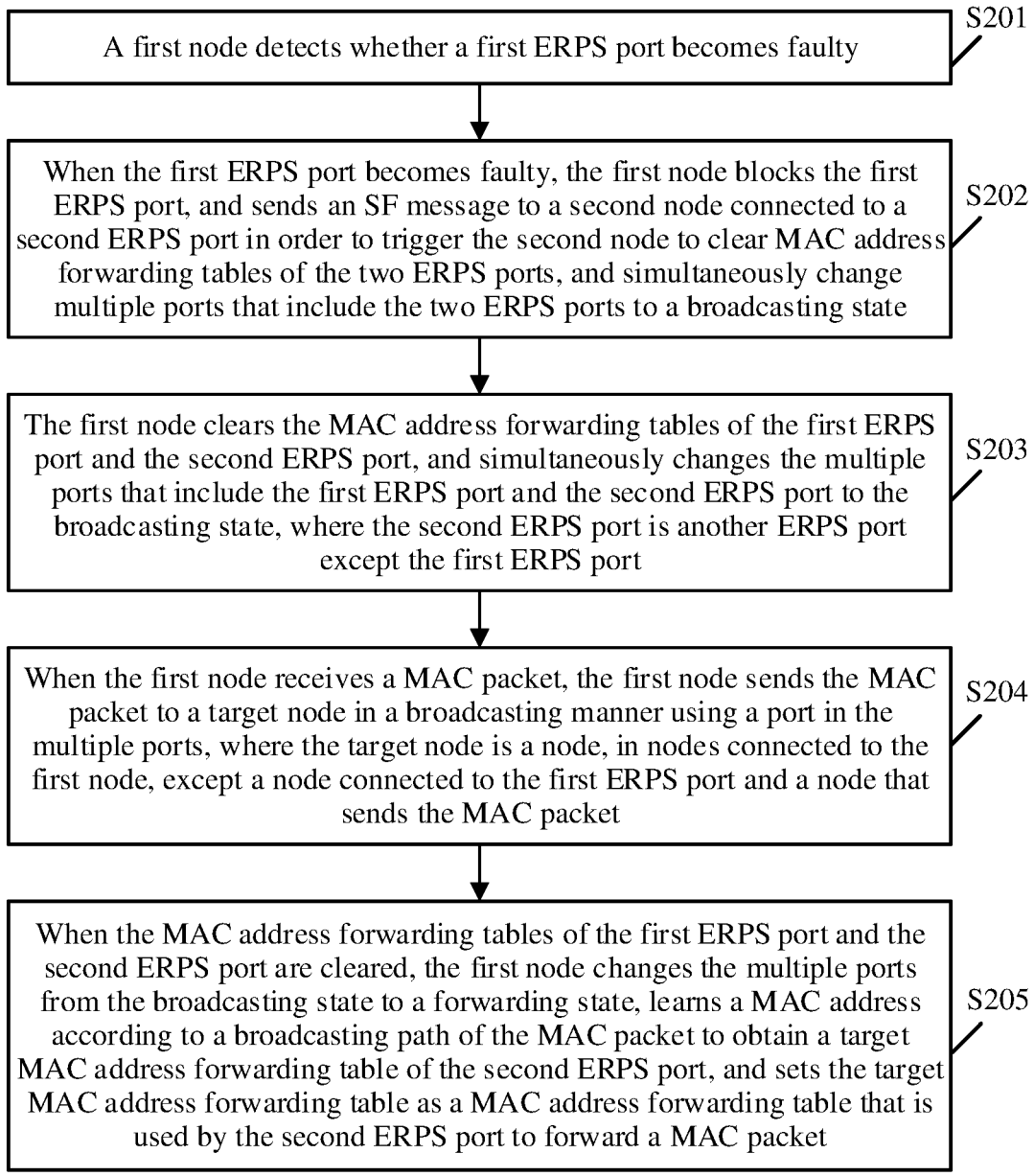
FIG. 2 is a flowchart of another ERPS method disclosed in an embodiment of the present disclosure.

Referring to FIG. 2, FIG. 2 is a flowchart of another ERPS method disclosed in an embodiment of the present disclosure. As shown in FIG. 2, the ERPS method may include the following steps.

Step S201: A first node detects whether a first ERPS port becomes faulty.

In this embodiment, in order to prevent problems such as a broadcast storm and MAC address flapping from occurring in an Ethernet ring, a link in the Ethernet ring is designated as an RPL, and a node connected to the RPL is referred to as an RPL Owner, that is, an RPL master node. In a normal case, the RPL master node blocks an RPL port connected to the RPL in order to prevent a loop from being formed.

In this embodiment, each node in the Ethernet ring includes two ERPS ports that have an ERPS attribute, and the node in the Ethernet ring may detect, by means of a port status, whether the ERPS ports become faulty. The first node may be any node in the Ethernet ring, and the first ERPS port may be either port of two ERPS ports of the first node.

In this embodiment, detecting whether the first ERPS port becomes faulty may be detecting whether the first ERPS port itself becomes faulty, or may be detecting whether a link connected to the first ERPS port becomes faulty, which is not limited in this embodiment. Whether the first ERPS port itself becomes faulty may be detected using hardware of the first ERPS port, and whether the link connected to the first ERPS port becomes faulty may be detected by detecting whether a signal is lost.

Step S202: When the first ERPS port becomes faulty, the first node blocks the first ERPS port, and sends an SF message to a second node connected to a second ERPS port in order to trigger the second node to clear MAC address forwarding tables of the two ERPS ports, and simultaneously change multiple ports that include the two ERPS ports to a broadcasting state.

In this embodiment, when the first ERPS port becomes faulty, it indicates that the first ERPS port cannot transmit a packet, and a packet originally transmitted using the first ERPS port cannot continue to be transmitted. Therefore, ERPS is triggered, and the first node blocks the first ERPS port such that after receiving a MAC packet, another port of the first node does not send the MAC packet to the first ERPS port. Then, the first node sends the SF message to the second node connected to the second ERPS port such that the second node sends the SF message to a third node, clears the MAC address forwarding tables of the two ERPS ports, and simultaneously changes the multiple ports that include the two ERPS ports to the broadcasting state. One ERPS port of the second node is connected to the first node, and the other ERPS port of the second node is connected to the third node.

In a possible implementation manner, a manner of blocking the first ERPS port by the first node includes blocking, by the first node, the first ERPS port, and unblocking the blocked second ERPS port when the first node is an RPL master node.

In this embodiment, when the first node is an RPL master node, the second ERPS port is an RPL port. Therefore, not only the first ERPS port needs to be blocked, but also the blocked second ERPS port needs to be unblocked.

Step S203: The first node clears the MAC address forwarding tables of the first ERPS port and the second ERPS port, and simultaneously changes the multiple ports that include the first ERPS port and the second ERPS port to the broadcasting state, where the second ERPS port is another ERPS port except the first ERPS port.

In this embodiment, after sending the SF message to the second node, the first node clears the MAC address forwarding tables of the first ERPS port and the second ERPS port, and simultaneously changes the multiple ports that include the first ERPS port and the second ERPS port to the broadcasting state, where the second ERPS port is another ERPS port except the first ERPS port.

Step S204: When the first node receives a MAC packet, the first node sends the MAC packet to a target node in a broadcasting manner using a port in the multiple ports, where the target node is a node, in nodes connected to the first node, except a node connected to the first ERPS port and a node that sends the MAC packet.

In this embodiment, the first node includes not only the first ERPS port and the second ERPS port but also a non-ERPS port. When any port in the second ERPS port and the non-ERPS port that are of the first node receives the MAC packet, the port that receives the MAC packet broadcasts the MAC packet to all ports included in the first node except the first ERPS port and the port that receives the MAC packet, and the ports send the MAC packet to a connected node.

Step S205: When the MAC address forwarding tables of the first ERPS port and the second ERPS port are cleared, the first node changes the multiple ports from the broadcasting state to a forwarding state, learns a MAC address according to a broadcasting path of the MAC packet to obtain a target MAC address forwarding table of the second ERPS port, and sets the target MAC address forwarding table as a MAC address forwarding table that is used by the second ERPS port to forward a MAC packet.

In this embodiment, when it is detected that the MAC address forwarding tables of the first ERPS port and the second ERPS port are cleared, the first node changes the multiple ports from the broadcasting state to the forwarding state, learns the MAC address according to the broadcasting path of the MAC packet to obtain the target MAC address forwarding table of the second ERPS port, and sets the target MAC address forwarding table as the MAC address forwarding table that is used by the second ERPS port to forward a MAC packet. After receiving a MAC packet subsequently, the second ERPS port performs forwarding according to the target MAC address forwarding table.

In the ERPS method described in FIG. 2, when an ERPS port becomes faulty, a MAC address forwarding table of the ERPS port is cleared, and simultaneously all ports are changed to a broadcasting state to broadcast a MAC packet. After the MAC address forwarding table of the ERPS port is cleared, a MAC address is learned. Because MAC address clearing and MAC packet broadcasting are performed simultaneously, ERPS time may be reduced, and ERPS efficiency may be improved.

Figure 3:
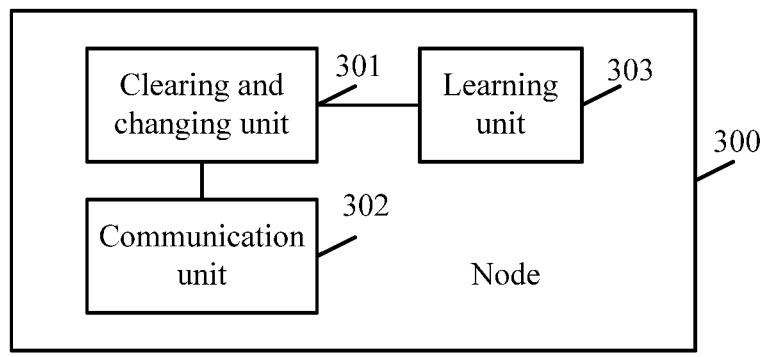
FIG. 3 is a structural diagram of a node disclosed in an embodiment of the present disclosure.

Referring to FIG. 3, FIG. 3 is a structural diagram of a node 300 disclosed in an embodiment of the present disclosure. As shown in FIG. 3, the node 300 may include a clearing and changing unit 301 configured to clear MAC address forwarding tables of the first ERPS port and a second ERPS port, and simultaneously change multiple ports that include the first ERPS port and the second ERPS port to a broadcasting state when a first ERPS port becomes faulty, where the second ERPS port is another ERPS port except the first ERPS port, a communication unit 302 configured to send the MAC packet to a target node in a broadcasting manner using a port in the multiple ports that are changed by the clearing and changing unit 301 when a MAC packet is received, where the target node is a node, in nodes connected to the node 300, except a node connected to the first ERPS port and a node that sends the MAC packet, and a learning unit 303 configured to change the multiple ports from the broadcasting state to a forwarding state, learn a MAC address according to a broadcasting path of the MAC packet to obtain a target MAC address forwarding table of the second ERPS port, and set the target MAC address forwarding table as a MAC address forwarding table that is used by the second ERPS port to forward a MAC packet when the MAC address forwarding tables of the first ERPS port and the second ERPS port are cleared by the clearing and changing unit 301.

In this embodiment, in order to prevent problems such as a broadcast storm and MAC address flapping from occurring in an Ethernet ring, a link in the Ethernet ring is designated as an RPL, and a node connected to the RPL is referred to as an RPL Owner, that is, an RPL master node. In a normal case, the RPL master node blocks an RPL port connected to the RPL in order to prevent a loop from being formed.

In this embodiment, when the first ERPS port becomes faulty, the clearing and changing unit 301 clears the MAC address forwarding tables of the first ERPS port and the second ERPS port, and simultaneously changes the multiple ports that include the first ERPS port and the second ERPS port to the broadcasting state, where the second ERPS port is another ERPS port except the first ERPS port.

In this embodiment, the node 300 includes not only the first ERPS port and the second ERPS port but also a non-ERPS port. When the communication unit 302 detects that any port in the second ERPS port and the non-ERPS port receives the MAC packet, the port that receives the MAC packet broadcasts the MAC packet to all ports included in the node 300 except the first ERPS port and the port that receives the MAC packet, and the ports send the MAC packet to a connected node.

In this embodiment, when it is detected that the MAC address forwarding tables of the first ERPS port and the second ERPS port are cleared by the clearing and changing unit 302, the learning unit 303 changes the multiple ports from the broadcasting state to the forwarding state, learns the MAC address according to the broadcasting path of the MAC packet to obtain the target MAC address forwarding table of the second ERPS port, and sets the target MAC address forwarding table as the MAC address forwarding table that is used by the second ERPS port to forward a MAC packet. After receiving a MAC packet subsequently, the second ERPS port performs forwarding according to the target MAC address forwarding table.

In the node described in FIG. 3, when an ERPS port becomes faulty, a MAC address forwarding table of the ERPS port is cleared, and simultaneously all ports are changed to a broadcasting state to broadcast a MAC packet. After the MAC address forwarding table of the ERPS port is cleared, a MAC address is learned. Because MAC address clearing and MAC packet broadcasting are performed simultaneously, ERPS time may be reduced, and ERPS efficiency may be improved.

Figure 4:
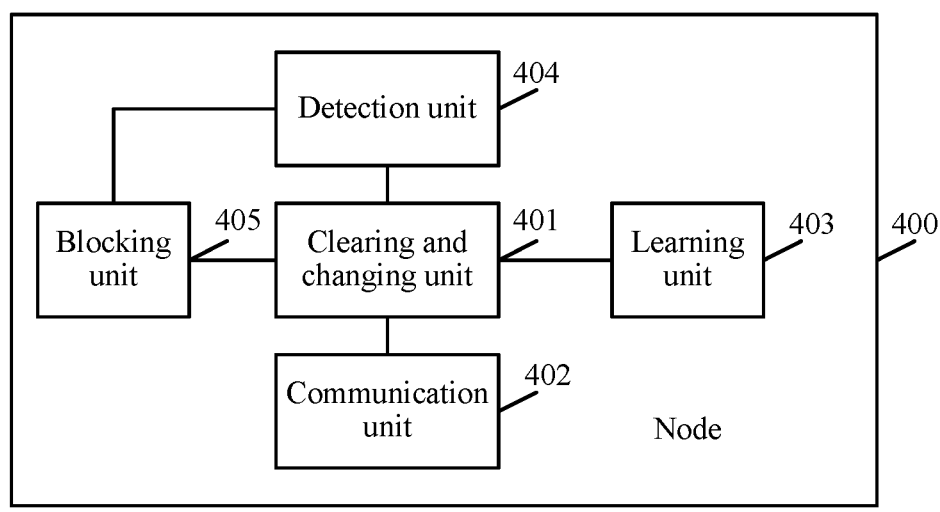
FIG. 4 is a structural diagram of another node disclosed in an embodiment of the present disclosure.

Referring to FIG. 4, FIG. 4 is a structural diagram of another node 400 disclosed in an embodiment of the present disclosure. As shown in FIG. 4, the node 400 may include a clearing and changing unit 401 configured to clear MAC address forwarding tables of the first ERPS port and a second ERPS port, and simultaneously change multiple ports that include the first ERPS port and the second ERPS port to a broadcasting state when a first ERPS port becomes faulty, where the second ERPS port is another ERPS port except the first ERPS port, a communication unit 402 configured to send the MAC packet to a target node in a broadcasting manner using a port in the multiple ports that are changed by the clearing and changing unit 401 when a MAC packet is received, where the target node is a node, in nodes connected to the node 400, except a node connected to the first ERPS port and a node that sends the MAC packet, and a learning unit 403 configured to change the multiple ports from the broadcasting state to a forwarding state, learn a MAC address according to a broadcasting path of the MAC packet to obtain a target MAC address forwarding table of the second ERPS port, and set the target MAC address forwarding table as a MAC address forwarding table that is used by the second ERPS port to forward a MAC packet when the MAC address forwarding tables of the first ERPS port and the second ERPS port are cleared by the clearing and changing unit 401.

In this embodiment, in order to prevent problems such as a broadcast storm and MAC address flapping from occurring in an Ethernet ring, a link in the Ethernet ring is designated as an RPL, and a node connected to the RPL is referred to as an RPL Owner, that is, an RPL master node. In a normal case, the RPL master node blocks an RPL port connected to the RPL in order to prevent a loop from being formed.

In this embodiment, when the first ERPS port becomes faulty, the clearing and changing unit 401 clears the MAC address forwarding tables of the first ERPS port and the second ERPS port, and simultaneously changes the multiple ports that include the first ERPS port and the second ERPS port to the broadcasting state, where the second ERPS port is another ERPS port except the first ERPS port.

In this embodiment, the node 400 includes not only the first ERPS port and the second ERPS port but also a non-ERPS port. When the communication unit 402 detects that any port in the second ERPS port and the non-ERPS port receives the MAC packet, the port that receives the MAC packet broadcasts the MAC packet to all ports included in the node 400 except the first ERPS port and the port that receives the MAC packet, and the ports send the MAC packet to a connected node.

In this embodiment, when it is detected that the MAC address forwarding tables of the first ERPS port and the second ERPS port are cleared by the clearing and changing unit 401, the learning unit 403 changes the multiple ports from the broadcasting state to the forwarding state, learns the MAC address according to the broadcasting path of the MAC packet to obtain the target MAC address forwarding table of the second ERPS port, and sets the target MAC address forwarding table as the MAC address forwarding table that is used by the second ERPS port to forward a MAC packet. After receiving a MAC packet subsequently, the second ERPS port performs forwarding according to the target MAC address forwarding table.

In a possible implementation manner, the node 400 may further include a detection unit 404 configured to detect whether a link connected to the first ERPS port becomes faulty, and determine that the first ERPS port becomes faulty if the link connected to the first ERPS port becomes faulty.

In a possible implementation manner, the node 400 may further include a blocking unit 405 configured to block the first ERPS port, and send an SF message to a second node connected to the second ERPS port in order to trigger the second node to clear the MAC address forwarding tables of the two ERPS ports and simultaneously change the multiple ports that include the two ERPS ports to the broadcasting state.

Further, when a detection result of the detection unit 404 is that the first ERPS port becomes faulty, the blocking unit 405 is triggered to block the first ERPS port, and send the SF message to the second node connected to the second ERPS port. The clearing and changing unit 401 is triggered to clear the MAC address forwarding tables of the first ERPS port and the second ERPS port, and simultaneously change the multiple ports that include the first ERPS port and the second ERPS port to the broadcasting state.

In a possible implementation manner, a manner of blocking the first ERPS port by the blocking unit 405 includes blocking the first ERPS port, and unblocking the blocked second ERPS port when the node 400 is an RPL master node.

In this embodiment, when the node 400 is an RPL master node, the second ERPS port is an RPL port. Therefore, the blocking unit 405 not only needs to block the first ERPS port, but also needs to unblock the blocked second ERPS port.

In the node described in FIG. 4, when an ERPS port becomes faulty, a MAC address forwarding table of the ERPS port is cleared, and simultaneously all ports are changed to a broadcasting state to broadcast a MAC packet. After the MAC address forwarding table of the ERPS port is cleared, a MAC address is learned. Because MAC address clearing and MAC packet broadcasting are performed simultaneously, ERPS time may be reduced, and ERPS efficiency may be improved.

Figure 5:
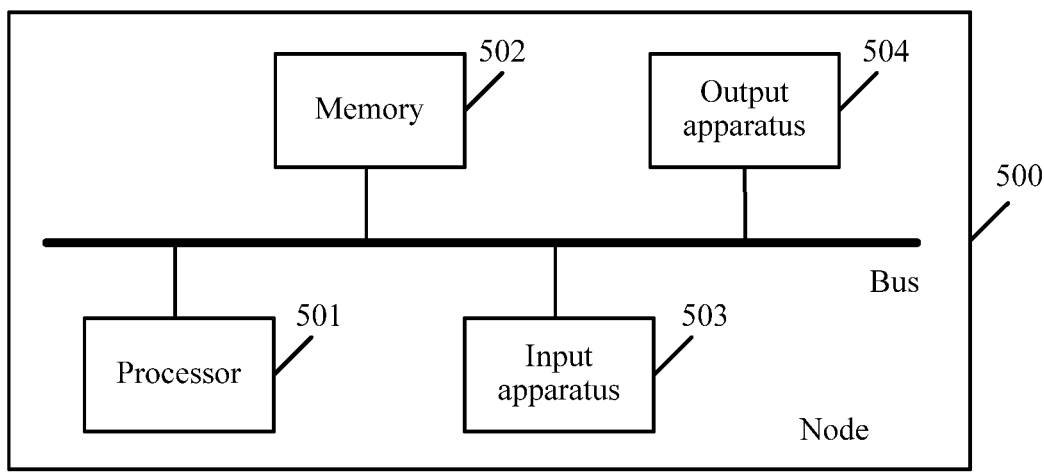
FIG. 5 is a structural diagram of still another node disclosed in an embodiment of the present disclosure.

Referring to FIG. 5, FIG. 5 is a structural diagram of still another node 500 disclosed in an embodiment of the present disclosure. As shown in FIG. 5, the node 500 may include a processor 501, a memory 502, an input apparatus 503, and an output apparatus 504. The memory 502 and the processor 501, the input apparatus 503 and the processor 501, or the output apparatus 504 and the processor 501 may be connected using a bus or in another manner. In FIG. 5, communication bus connection is used as an example.

The memory 502 stores a group of program code, and the processor 501 is configured to invoke the program code stored in the memory 502 to perform the operations of clearing MAC address forwarding tables of a first ERPS port and a second ERPS port, and simultaneously changing multiple ports that include the first ERPS port and the second ERPS port to a broadcasting state when the first ERPS port becomes faulty, where the second ERPS port is another ERPS port except the first ERPS port.

The input apparatus 503 is configured to receive a MAC packet and send the MAC packet to the output apparatus 504.

The output apparatus 504 is configured to send the MAC packet to a target node in a broadcasting manner using a port in the multiple ports, where the target node is a node, in nodes connected to the node 500, except a node connected to the first ERPS port and a node that sends the MAC packet.

The processor 501 is further configured to invoke the program code stored in the memory 502 to perform the operations of changing the multiple ports from the broadcasting state to a forwarding state, learning a MAC address according to a broadcasting path of the MAC packet to obtain a target MAC address forwarding table of the second ERPS port, and setting the target MAC address forwarding table as a MAC address forwarding table that is used by the second ERPS port to forward a MAC packet when the MAC address forwarding tables of the first ERPS port and the second ERPS port are cleared.

In a possible implementation manner, the processor 501 is further configured to invoke the program code stored in the memory 502 to perform the operations of detecting whether a link connected to the first ERPS port becomes faulty, and determining that the first ERPS port becomes faulty if the link connected to the first ERPS port becomes faulty.

In a possible implementation manner, when the first ERPS port becomes faulty, and before the processor 501 clears the MAC address forwarding tables of the first ERPS port and the second ERPS port, the processor 501 is further configured to invoke the program code stored in the memory 502 to perform the operation of blocking the first ERPS port.

The output apparatus 504 is further configured to send an SF message to a second node connected to the second ERPS port in order to trigger the second node to clear the MAC address forwarding tables of the two ERPS ports and simultaneously change the multiple ports that include the two ERPS ports to the broadcasting state.

In a possible implementation manner, a manner of blocking the first ERPS port by the processor 501 includes blocking the first ERPS port, and unblocking the blocked second ERPS port when the node 500 is an RPL master node.

In the node 500 described in FIG. 5, when an ERPS port becomes faulty, a MAC address forwarding table of the ERPS port is cleared, and simultaneously all ports are changed to a broadcasting state to broadcast a MAC packet. After the MAC address forwarding table of the ERPS port is cleared, a MAC address is learned. Because MAC address clearing and MAC packet broadcasting are performed simultaneously, ERPS time may be reduced, and ERPS efficiency may be improved.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The foregoing further introduces the ERPS method and the node provided in embodiments of the present disclosure. In this specification, specific examples are used to describe the principle and implementation manners of the present disclosure, and the description of the embodiments is only intended to help understand the method and core idea of the present disclosure. Meanwhile, persons of ordinary skill in the art may, based on the idea of the present disclosure, make modifications with respect to the specific implementation manners and the application scope. Therefore, the content of this specification shall not be construed as a limitation to the present disclosure.

What is claimed is:

1. An Ethernet ring protection switching (ERPS) method, comprising:
   clearing, by a first node, Media Access Control (MAC) address forwarding tables of a plurality of ports of the first node when a first ERPS port becomes faulty, wherein the plurality of ports include the first ERPS port, a second ERPS port, and a third port, wherein the first ERPS port is coupled to a second node;

while clearing the MAC address forwarding tables, changing the plurality of ports to a broadcasting state to broadcast a plurality of MAC packets when the first ERPS port becomes faulty such that clearing the MAC address forwarding tables and broadcasting the plurality of MAC packets occur simultaneously;

receiving, by the third port, a MAC packet from a third node;

broadcasting, by the third port, the MAC packet to the second ERPS port;

sending, by the first node, the MAC packet to a fourth node in a broadcasting manner using at least one port in the plurality of ports except the first ERPS port and the third port when the first node receives the MAC packet, wherein the at least one port includes the second ERPS port;

changing, by the first node, the plurality of ports from the broadcasting state to a forwarding state;

learning, by the first node, a MAC address according to a broadcasting path of the MAC packet to obtain a target MAC address forwarding table of the second ERPS port; and setting, by the first node, the target MAC address forwarding table as a MAC address forwarding table used by the second ERPS port to forward the MAC packet, wherein when the first ERPS port becomes faulty, and before clearing the MAC address forwarding tables, the method further comprises:
  blocking, by the first node, the first ERPS port; and
  sending, by the first node, a signal failure message to a fifth node coupled to the second ERPS port, wherein the first node sends the signal failure message in order to trigger the fifth node to clear the MAC address forwarding tables and simultaneously change the plurality of ports to the broadcasting state.

2. The ERPS method of claim 1, further comprising:
detecting, by the first node, whether a link coupled to the first ERPS port becomes faulty; and
determining, by the first node, that the first ERPS port becomes faulty when the link coupled to the first ERPS port becomes faulty.

3. The ERPS method of claim 1, wherein when the first ERPS port becomes faulty, and before clearing the MAC address forwarding tables, the first node blocks the first ERPS port and sends the signal failure message to further trigger the fifth node to send the signal failure message to a sixth node.

4. The ERPS method of claim 3, wherein blocking the first ERPS port comprises:
blocking, by the first node, the first ERPS port when the first node is a ring protection link (RPL) master node; and
unblocking, by the first node, the second ERPS port, wherein the second ERPS port is an RPL port.

5. A node in an Ethernet ring comprising a plurality of nodes, the node comprising:
a plurality of ports including a first Ethernet ring protection switching (ERPS) port, a second ERPS port, and a third port, wherein the first port is coupled to a second node in the Ethernet ring, wherein each node in the Ethernet ring includes at least two ERPS ports;
a memory comprising a program code; and
a processor coupled to the memory and the ports, the program code causing the processor to be configured to:
clear Media Access Control (MAC) address forwarding tables of the plurality of ports when the first ERPS port becomes faulty;
while clearing the MAC address forwarding tables, change the plurality of ports to a broadcasting state to broadcast a plurality of MAC packets when the first ERPS port becomes faulty such that clearing the MAC address forwarding tables and broadcasting the plurality of MAC packets occur simultaneously;
receive, by the third port, a MAC packet from a third node;
broadcast, by the third port, the MAC packet to the second ERPS port;
send the MAC packet to a fourth node in a broadcasting manner using at least one port in the plurality of ports except the first ERPS port and the third port, the at least one port including the second ERPS port;
change the plurality of ports from the broadcasting state to a forwarding state;
learn a MAC address after clearing the MAC address forwarding tables, wherein the node learns the MAC address according to a broadcasting path of the MAC packet to obtain a target MAC address forwarding table of the second ERPS port;
set the target MAC address forwarding table as a MAC address forwarding table used by the second ERPS port to forward the MAC packet, wherein the third port is a non-ERPS port, and wherein when the non-ERPS port receives the MAC packet, the non-ERPS port broadcasts the MAC packet to all ports included in the first node except the first ERPS port;
block the first ERPS port; and
send a signal failure message to a fifth node coupled to the second ERPS port, wherein the processor sends the signal failure message in order to trigger the fifth node to clear the MAC address forwarding tables and simultaneously change the plurality of ports to the broadcasting state.

6. The node of claim 5, wherein the program code further causes the processor to be configured to:
detect whether a link coupled to the first ERPS port becomes faulty; and
determine that the first ERPS port becomes faulty when the link coupled to the first ERPS port becomes faulty.

7. The node of claim 5, wherein the program code further causes the processor to be configured to:
block the first ERPS port when the node is a ring protection link (RPL) master node; and
unblock the second ERPS port, wherein the second ERPS port is an RPL port.

8. A computer program product comprising a non-transitory computer readable storage medium storing program code thereon for an Ethernet ring protection switching (ERPS), the program code comprising instructions that, when executed by a processor, cause the processor to:
clear, by a first node, Media Access Control (MAC) address forwarding tables of a plurality of ports when a first ERPS port becomes faulty, wherein the plurality of ports include the first ERPS port, a second ERPS port, and a third port, wherein the first ERPS port is coupled to a second node;
while clearing the MAC address forwarding tables, change the plurality of ports to a broadcasting state to broadcast a plurality of MAC packets when the first ERPS port becomes faulty such that clearing the MAC address forwarding tables and broadcasting the plurality of MAC packets occur simultaneously;

receive, by the third port, a MAC packet from a third node;

broadcast, by the third port, the MAC packet to the second ERPS port;

send, by the first node, the MAC packet to a fourth node in a broadcasting manner using at least one port in the plurality of ports, wherein the at least one port includes the second ERPS port;

change, by the first node, the plurality of ports from the broadcasting state to a forwarding state;

learn, by the first node, a MAC address according to a broadcasting path of the MAC packet to obtain a target MAC address forwarding table of the second ERPS port; and set, by the first node, the target MAC address forwarding table as a MAC address forwarding table used by the second ERPS port to forward the MAC packet, wherein when the first ERPS port becomes faulty, and before clearing the MAC address forwarding tables, the instructions are further configured to cause the processor to:

block, by the first node, the first ERPS port such that after receiving the MAC packet, another port of the first node does not send the MAC packet to the first EPRS port; and send, by the first node, a signal failure message to a fifth node coupled to the second ERPS port such that the fifth node (1) sends the signal failure message to a sixth node, (2) clears the MAC address forwarding tables of the plurality of ports, and (3) simultaneously changes the plurality of ports to the broadcasting state.

9. The computer program product of claim 8, wherein the instructions are further configured to cause the processor to:

detect, by the first node, whether a link coupled to the first ERPS port becomes faulty; and determine, by the first node, that the first ERPS port becomes faulty when the link coupled to the first ERPS port becomes faulty.

10. The computer program product of claim 8, wherein one ERPS port of the fifth node is coupled to the first node and another ERPS port of the fifth node is connected to a sixth node.

11. The computer program product of claim 10, wherein the instructions are configured to cause the processor to block the first ERPS port by causing the processor to:

block, by the first node, the first ERPS port when the first node is a ring protection link (RPL) master node; and unblock, by the first node, the second ERPS port, wherein the second ERPS port is an RPL port.

12. The computer program product of claim 8, wherein the third port is a non-ERPS port, and wherein when the non-ERPS port receives the MAC packet, the non-ERPS port broadcasts the MAC packet to all ports included in the first node except the first ERPS port.

13. The ERPS method of claim 1, wherein the third port is a non-ERPS port, and wherein when the non-ERPS port receives the MAC packet, the non-ERPS port broadcasts the MAC packet to all ports included in the first node except the first ERPS port.

14. The node of claim 5, wherein the non-ERPS port broadcasts the MAC packet to all ports such that said all ports send the MAC packet to a target node connected to the first node via the non-ERPS port.

15. The ERPS method of claim 3, wherein one ERPS port of the fifth node is connected to the first node and another ERPS port of the fifth node is connected to the sixth node.

16. The ERPS method of claim 13, wherein the non-ERPS port broadcasts the MAC packet to all ports such that said all ports send the MAC packet to a target node connected to the first node via the non-ERPS port.

* * * * *